United States Patent [19]

Miyashita et al.

[11] Patent Number: 4,786,663
[45] Date of Patent: Nov. 22, 1988

[54] FLAME RETARDANT RESIN COMPOSITIONS

[75] Inventors: Shunitsu Miyashita; Kenji Mogami, both of Kobe, Japan

[73] Assignee: Kanegafuchi Kagaku Kogyo Kabushiki Kaisha, Osaka, Japan

[21] Appl. No.: 6,033

[22] Filed: Jan. 22, 1987

[30] Foreign Application Priority Data

Jan. 23, 1986 [JP] Japan .................................. 61-12682

[51] Int. Cl.$^4$ ................................................ C08K 3/24
[52] U.S. Cl. ................................... 524/410; 524/371; 524/467; 524/469
[58] Field of Search ................ 423/617, 593; 524/410, 524/371, 467, 469; 252/611, 607; 428/921

[56] References Cited

U.S. PATENT DOCUMENTS 3,892,667 7/1975 Touval ................................. 252/609
4,035,333 7/1977 Kamada et al. ...................... 524/410

OTHER PUBLICATIONS

Scholder, R. et al.: CA 52, 19638f (1958).
Schrewelius, Nils: CA 32, 73247 (1938).

*Primary Examiner*—Veronica P. Hoke
*Attorney, Agent, or Firm*—Armstrong, Nikaido, Marmelstein & Kubovcik

[57] ABSTRACT

The present invention provides flame retardant resin compositions containing thermoplastic polyesters, organic halides and sodium antimonate, characterized in that the sodium antimonate has a ratio of the peak intensity of X-ray diffraction from face distances d of 5.25~5.35 (Å) to that of 2.64~2.66 (Å) being 1.5 or higher and mean particle diameter of 0.5~50 μm, and is 1~15 parts by weight in proportion to 100 parts by weight of the aformentioned thermoplastic polyester. This invention provides thermoplastic resin compositions excellent in mechanical properties, hygroscopicity and thermal stability.

7 Claims, No Drawings

FLAME RETARDANT RESIN COMPOSITIONS

BACKGROUND OF THE INVENTION

1. Field of the invention

The present invention relates to flame retardant resin compositions, and more particularly, pertains to flame retardant thermoplastic polyester resin compositions which are excellent in mechanical properties, hygroscopicity and thermal stability.

2. Description of the Prior Art

Flame retardant thermoplastic polyester resin compositions using flame retarders with organic halides as their main components are problematical in thermal stability. Particularly, flame retardant polyethylene terephthalate resin compositions excellent in heat resistance require relatively high molding temperatures and undergo thermal degradation while being molded. For example, a flame retardant thermoplastic polyester resin compound improved in thermal stability was disclosed in Patent Laid Open No. Sho 57-195142. According to this patent, thermal stabilization is increased by forming an inert film for protection against hydrolysis of thermoplastic polyesters by treating with alkoxy silane the surface of antimony trioxide which is added to provide flame retardancy. However, as clarified by examples in said Gazette, the mechanical strengths, particularly the tensile strength, of the molded products illustrated are relatively low, such that they can hardly be said quite satisfactory in particular fields. The Patent Laid Open No. Sho 57-2357 states that the coated antimony oxide has no thermal stability which diminishes the commercial value of the product. In this Gazette, mention is made of particular compositions which are excellent in thermal stability. This Gazette says that particular substances which promote the rate of crystallization and antimonates of metals belonging to Groups I, II and VIII of the Periodic Table, when jointly used in flame retarder system, will enhance flame retardancy of the compositions, without badly affecting their thermal stability. Generally, crystallization promotors have a tendency to reduce mechanical strengths of resin compositions, and accordingly, their use is limited. It is widely known that oxides of antimony such as antimony trioxide, antimony pentoxide, etc. promote hydrolysis of thermoplastic polyesters. Use of antimonates is known to improve their hydrolyzing property. But antimonates have hygroscopicity such that when added to flame retardant thermoplastic polyester resins, they induce deterioration of said resins, as they are being molded, giving rise to lowered mechanical strengths and dripping of molten resin at the time of combustion. That antimonates are effective flame retarders is well known by U.S. Pat. Nos. 3,892,667 and 3,897,389, for example. However, use of antimonates having high hygroscopicity, for example, sodium antimonate, in flame retardant thermoplastic polyester resin compositions will fail to provide flame retardant resin compositions having both high mechanical strengths and excellent thermal stability. Against this background, there is a strong call for flame retardant thermoplastic polyester resin compositions having relatively high mechanical strengths, involving no practical problem in regard to hygroscopicity and also being excellent in thermal stability.

SUMMARY OF THE INVENTION

The object of this invention is to provide flame retardant thermoplastic polyester resin compositions having relatively high mechanical strengths, involving no problem of hygroscopicity in their practical use and being excellent in thermal stability. Other objects and advantages of this invention will become apparent from the following detailed description.

DETAILED DESCRIPTION OF THE INVENTION

The present invention comprises flame retardant resin compositions containing thermoplastic polyesters, organic halides and sodium antimonate, characterized in that the sodium antimonate has the ratio of peak intensity of X-ray diffraction from the face distances d of 5.25~5.35 (Å) to that of 2.64~2.66 (Å) in X-ray diffraction of 1.5 or higher and mean particle diameters of 0.5~50 μm, and is 1~15 parts by weight in proportion to 100 parts by weight of the aforementioned thermoplastic polyesters.

The thermoplastic polyesters of this invention refer to linear saturated polyesters obtained by using, as acid components, terephthalic acid or its derivatives capable of forming its esters and, as glycol components, glycols having 2~10 carbon atoms or their derivatives capable of forming their esters. Mentioned as particular examples are polyethylene terephthalate, polypropylene terephthalate, polybutylene terephthalate, polytetramethylene terephthalate, polyhexamethylene terephthalate, etc. These thermoplastic polyesters may be used singly or in mixture of 2 or more members. The aforementioned thermoplastic polyesters may contain up to 50% by weight of other components, e.g., diethylene glycol, polyalkylene oxide, aromatic diols, etc. Particularly, mixtures or copolymers containing 1~30% by weight of polyalkylene oxides like polyethylene glycol, etc. having molecular weights of 200~5000 have well balanced mechanical strengths and thermal stability. And particularly, compositions consisting of 1~20 parts by weight of diols represented by the undermentioned general formula (A) and 80~99 parts by weight of polyethylene terephthalate, block copolymers in particular, are preferable:

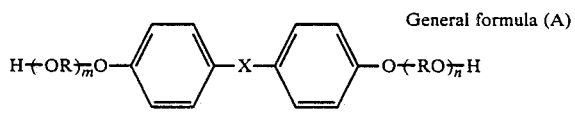

General formula (A)

(where X denotes —C(CH$_3$)$_2$—, —SO$_2$—, —CO— and —O— groups; R, alkylene groups of C$_4$ or lower; and n and m, integers of 5~15). The intrinsic viscosity of the aforementioned thermoplastic polyesters should preferably be 0.4~1.2, as measured at 25° C. in a 1:1 (weight ratio) mixed solvent of phenol and 1,1,2,2-tetrachloroethane, and 0.5~1.0, particularly 0.55~0.70, being further preferable.

Organic halides, as specified in this invention, particularly include tetrabromobisphenol A and its oligomers, decabromobiphenyl oxide, octabromobiphenyl oxide, polydibromophenylene oxide, brominated polystyrene, condensate of 2 mols of tetrachlorocyclopentadiene and 1 mol of cyclooctadiene, polypentabromobenzyl acrylate, condensate of tetrabisphenol A and cyanuric chloride and tribromophenol, hexabromocyclododecane, condensate of tribromophenol and glycidol, etc. Use of halogen containing aromatic compounds having halogen atoms directly coupled to benzene rings, of the aforementioned compounds, should be preferred. Preferable types of halogen are bromine and chlorine. The amounts of organic halides to be mixed with said compositions as flame retarders which are sufficient to make them flame retardant are proper. Normally, it is proper to mix 5~50 parts by weight, preferably, 10~30 parts by weight of them in proportion to 100 parts by weight of thermoplastic polyesters. If the mixing rate is smaller than 5 parts by weight, the requirement for flame retardancy sometimes may not be satisfied; on the other hand, if it exceeds 50 parts by weight, degradation in the mechanical strengths of said flame retardant resin compositions becomes drastic.

It is necessary for the sodium antimonate used according to this invention to give the ratio of the peak intensity of X-ray diffraction from face distances d of 5.25~5.35 (Å) to that of 2.64~2.66 (Å) of 1.5 or higher and have mean particle diameters of 0.5~50 μm. 2.0 or higher diffraction intensity peak ratio is more preferable, and 3.0 or higher is particularly preferable. The X-ray diffraction intensity peak ratio is correlated with said resin composition's hygroscopicity. As the peak ratio becomes 1.5 or higher, the hygroscopicity declines. When it is 2.0 or higher, the hygroscopicity has insignificant effect on practical use. In the case of 3.0 or higher, further improvement is recognized.

CONDITIONS OF X-RAY DIFFRACTION MEASUREMENT

Sample: A ⅛ inch thick flat plate of said flame retardant resin composition containing a definite amount (e.g., 2 wt %) of antimonate.

X-Ray tube: CuK$\alpha$ 40 KV 50 mA.

Scanning speed: 4 deg/min.

Mean particle diameters of 0.5~50 μm result in a good balance between thermal stability, flame retardancy and mechanical characteristics, thus consistent with an object of this invention. Mean particle diameters being 1~30 μm are further preferable, and 2~20 μm particularly favorable. Products with mean particle diameters smaller than 0.5 μm are excellent in flame retardancy, but have smaller effect on improving thermal stability. As the particle diameter exceeds 50 μm, the flame retardancy declines; thus the amount of the flame retarder required to maintain the same degree of flame retardancy increases, with growing particle diameters, inviting decline in thermal stability. The mean particle diameter may be measured by an automatic particle size distribution measuring instrument, type RS-1000 (manufactured by Shimazu Manufactory).

The amount of antimonate used should be 1~15 parts by weight, preferably 2~10 parts by weight, in proportion to 100 parts by weight of thermoplastic polyester. If it is smaller than 1 part by weight, sometimes insufficient flame retardancy occurs. But if it exceeds 15 parts by weight, the decline in mechanical properties and thermal stability is large, which is contradictory to the spirit of this invention. The antimonate which meets the above-mentioned requirements needs to be used in an amount of 85% by weight or higher, more preferably, 95% by weight or higher, of the total antimonate.

In the flame retardant resin compositions of this invention, up to 200 parts by weight of some organic or inorganic reinforcing agents and fillers may be mixed with 100 parts by weight of thermoplastic polyesters, as required. Their addition over 200 parts by weight will make molding difficult, and simultaneously, the mechanical strengths of the compositions will diminish. The preferable mixing rate should preferably be 150 parts by weight or smaller.

What are called organic and inorganic reinforcing materials and fillers are substances added to said flame retardant resin compositions for the purpose of enhancing their function. Particularly, such materials include fibrous reinforcing materials such as glass fiber, carbon fiber, asbestos, aromatic polyamide fibers, silicon carbide fiber, potassium titanate fiber, ore fibers, etc. and potassium carbonate, magnesium carbonate, baked clay, graphite, mica, talc, glass beads, metal powders and fluororesin powders, etc. They may be used by mixing therewith singly or in combinations of more than 2 members of them.

The flame retardant resin compositions of this invention may be mixed, in addition to the above-mentioned components, with additives generally employed with flame retardant polyester resins, e.g., antioxidants, coloring agents, crystallization promotors, plasticizers and resins other than polyesters, etc.

The manufacturing method of said flame retardant resin compositions are not particularly limited. The most handy and general method comprises weighing out the composition, mixing it with the above-mentioned materials by means of a ribbon blender and extruding the mixture at 240° C.~290° C., for example, a temperature commonly used for thermoplastic polyesters. Further, if need be, the mixture may be subjected to injection molding at the aforementioned temperature. One thing important at the time of molding is to reduce the moisture in said composition to 0.1% or less, more preferably, to 0.05% or less.

In the following, the present invention is further particularly described in connection with preferred embodiments and comparative examples cited, but this invention will not be bound thereby in any way. To be noted here is that parts (as appear in the text) designate parts by weight, and %, % by weight.

EXAMPLES 1~3

While stirring in a 1:1 (weight ratio) mixed solvent of phenol and 1,1,2,2-tetrachloroethane by means of a ribbon blender 4.6 kg of polyethylene terephthalate with intrinsic viscosity 0.63, as measured at 25° C., and dried to reduce its moisture to less than 0.03%, 1.4 kg of brominated polystyrene "PYRO-CHEK 68PB" (trade name, manufactured by Ferro Corporation), 0.3 kg sodium antimonate heat-treated as shown in Table 1, 0.5 kg of copolymer of ethylene and unsaturated carboxylic acid "HI-MILAN 1707" (trade name, manufactured by Mitsui-DuPont Polychemical), 0.2 kg of erucic acid amide, 50 g of a stabilizer "IRGANOX 1010" (trade name, manufactured by Ciba-Geigy) and 50 g of another stabilizer "SEENOX 412S" (trade name, manufactured by Shipro kasei Kaisha, Ltd.), 15 g of $\gamma$-glycidoxypropyltrimethoxysilane (A-187, manufactured by Nippon Unicar Co. was added, and the stirring was subsequently continued for 5 min. This mixture was fused and kneaded, using a biaxial extruder PCM-45 manufactured by Ikegai Iron Works Co., Ltd., yielding a pellet shape resin composition. At this time, a glass fiber (GLASSLON 03JA-486A, manufactured by Asahi Fiber Co., Ltd.) was added to be 30% in proportion to said composition in the midst of the biaxial extruder. The temperature condition in the extrusion was such that a temperature gradient was provided from 280° C. to 260° C. along the route from the hopper side to the dies side. Other general conditions were so chosen as to permit the extrusion to be made stably. Then this pellet form resin was dried to 140° C. for 4 hr, and the test piece was prepared from it, using an injection molder (IS-50A, manufactured by Toshiba Machinery Co., Ltd.). At this time, as a method of evaluating the thermal stability, two levels of injection molding temperature—normal temperature (270° C.) and high temperature (300° C.)—were set, and the mechanical strengths of products were examined, respectively. The injection molding conditions were: Die temperature 80° C., cooling time 30 sec, primary injection pressure 495 kg/cm², secondary injection pressure 360 kg/cm², and injection time 7 sec. The evaluation of thermal stability was made by way of comparison in terms of tensile strength between the test pieces injection molded at 270° C. and at 300° C., respectively. The results are put up in Table 1.

COMPARATIVE EXAMPLES 1~3

Experiments were conducted with the heat-treatment of sodium antimonate omitted in one case and with the heat treating conditions altered in other cases. Other conditions were identical. The results are listed in Table 1:

EXAMPLE 4

In the experiment of Example 3, 1.3 kg of polypentabromobenzyl acrylate (FR-1025, manufactured by Dead Sea Bromine Co., Ltd.) was used in place of "PYRO-CHEK 68PB". Results are given in Table 2.

EXAMPLE 5

In the experiment of Example 2, polyethylene terephthalate (with ultimate viscosity 0.60) formed by block copolymerization of 5% of ethylene oxide addition polymer of bisphenol A (the ratio of bisphenol to ethylene oxide is 1:17, mean molecular weight 1000) was used in place of polyethylene terephthalate. Other conditions were identical. Results are shown in Table 2.

EXAMPLE 6

In a 1:1 (weight ratio) mixed solvent of phenol and 1,1,2,2-tetrachloroethane, 5.3 kg of polyethylene terephthalate with intrinsic viscosity 0.58, as measured at 25° C., and dried to have less than 0.03% moisture, 1.4 kg of polydibromophenylene oxide (PO-64P, manufactured by Great Lakes Chemical Corporation), 0.3 kg of sodium antimonate, 50 g of "IRGANOX 1010", 50 g of "SEENOX 412S", 10 g of "A-187", and "GLASSLON 03MJ-429" (added to be 30% in proportion to said composition) were treated similarly as in Example 1, yielding a test piece. Results of measurements are listed in Table 2.

TABLE 1

|  | Heat-treating conditions of sodium antimonate | Mean particle diameter of sodium antimonate | *1 X-Ray diffraction line intensity peak ratio | *2 Hygroscopicity (%) | *3 Flammability | *4 Thermal stability (%) |
|---|---|---|---|---|---|---|
| Example 1 | 600° C. × 1 Hr | 3.8 μm | 1.8 | 0.51 | V-0 | 95.6 |
| Example 2 | 700° C. × 1 Hr | 4.5 | 2.0 | 0.49 | V-0 | 97.3 |
| Example 3 | 900° C. × 1 Hr | 1.0 | 3.7 | 0.47 | V-0 | 98.0 |
| Comparative Example 1 | Without heat treatment | 2.5 | 1.1 | 0.76 | V-2 | 88.1 |
| Comparative Example 2 | 500° C. × 1 Hr | 2.5 | 1.3 | 0.67 | V-0 | 88.7 |
| Comparative Example 3 | 600° C. d 1 Hr | 55 | 1.8 | 0.50 | V-1 | 96.1 |

*1 Conditions of X-ray diffraction measurement
Equipment    Rigaku Rotaflex Ru-200
X-Ray tube    CuKα  40 KV  50 mA
Scanning speed   4 degrees/min
Form of test piece  ⅛ inch thick flat plate
Peak ratio (2)/(1), where (1) denotes peak intensity (cps) of diffraction lines from face distances d of 2.64~2.66 (Å), and (2) peak intensity (cps) from d of 5.25~5.35 (Å).
*2 Rate of weight increase of a 120 × 120 × 3 mm test piece at 60° C. and 95% RH, when held stationary for 100 hr.
*3 UL-94 Test piece thickness 1/32 inch
*4 (Tensile strength of test piece when molded at 300° C./tensile strength of test piece when molded at 270° C.) × 100 (%).
The tensile strength measurements were taken according to ASTM D-638.

TABLE 2

|  | Heat-treating conditions of sodium antimonate | Mean particle diameter of sodium antimonate | *1 X-Ray diffraction line intensity peak ratio | *2 Hygroscopicity (%) | *3 Flammability | *4 Thermal stability (%) |
|---|---|---|---|---|---|---|
| Example 4 | 900° C. × 1 Hr | 1.0 μm | 3.7 | 0.49 | V-0 | 97.7 |
| Example 5 | 700° C. × 1 Hr | 4.5 | 2.0 | 0.52 | V-0 | 96.4 |
| Example 6 | 600° C. × 1 Hr | 3.8 | 1.8 | 0.48 | V-0 | 98.5 |

*1 Conditions of X-ray diffraction measurement
Equipment    Rigaku Rotaflex RU-200
X-Ray tube    CuKα  40 KV  50 mA
Scanning speed   4 deg/min
Form of test piece  ⅛ inch thick flat plate
Peak ratio (2)/(1), where (1) denotes peak intensity (cps) of X-ray diffraction from face

TABLE 2-continued distances d of 2.64~2.66 (Å), and (2) peak intensity (cps) from d of 5.25~5.35 (Å).
*2 Rate of weight increase of a 120 × 120 × 3 mm test
piece at 60° C. and 95% RH, when held stationary for 100 hr.
*3 UL-94 Test piece thickness 1/32 inch
*4 (Tensile strength of test piece when molded at
300° C./tensile strength of test piece when molded at 270° C.) × 100 (%).
The tensile strength measurements were taken according to ASTM D-638.

As hereabove described, according to this invention, it is possible to provide excellent flame retardant resin compositions having high strengths and well balanced hygroscopicity and thermal stability.

What is claimed is:

1. Flame retardant resin compositions containing thermoplastic polyesters, organic halides and sodium antimonate, characterized in that the sodium antimonate has the ratio of the peak intensity of X-ray diffraction from face distances d of 5.25~5.35 (Å) to that of 2.64~2.66 (Å) of 1.5 or higher and mean particle diameters of 0.5~50 μm, and is 1~15 parts by weight in proportion to 100 parts by weight of the aforementioned thermoplastic polyesters.

2. Flame retardant resin compositions according to claim 1, wherein the mean particle diameter of sodium antimonate is 1~30 μm.

3. Flame retardant resin compositions according to claim 1, wherein the X-ray diffraction intensity peak ratio of sodium antimonate is 2.0 or higher.

4. Flame retardant resin compositions according to claim 1, wherein the thermoplastic polyester is polyethylene terephthalate.

5. Flame retardant resin compositions according to claim 4, wherein the thermoplastic polyester is denatured polyethylene terephthalate.

6. Flame retardant resin compositions according to claim 1, wherein the thermoplastic polyesters are block copolymers of polyethylene terephthalate and segments represented by the undermentioned general formula (A), with their content in said copolymers being 1~20 parts by weight:

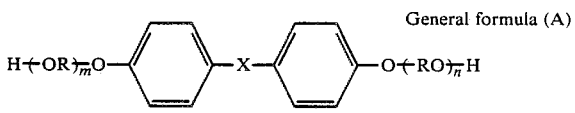

General formula (A)

wherein X denotes —C(CH$_3$)$_2$—, —SO$_2$—, —CO— and —O— groups; R is an alkylene group of C$_4$ or lower; and n and m, integers of 5~15.

7. Flame retardant resin compositions according to claim 1, wherein the sodium antimonate is heat-treated at a temperature of about 600° to about 900° C. for a period sufficient to cause the ratio of peak intensity to be 1.5 or more.

* * * * *